Nov. 7, 1950 — H. B. DE VORE — 2,528,582
LENS FOR FOCUSING RADIO WAVES
Filed Oct. 30, 1947 — 2 Sheets-Sheet 1
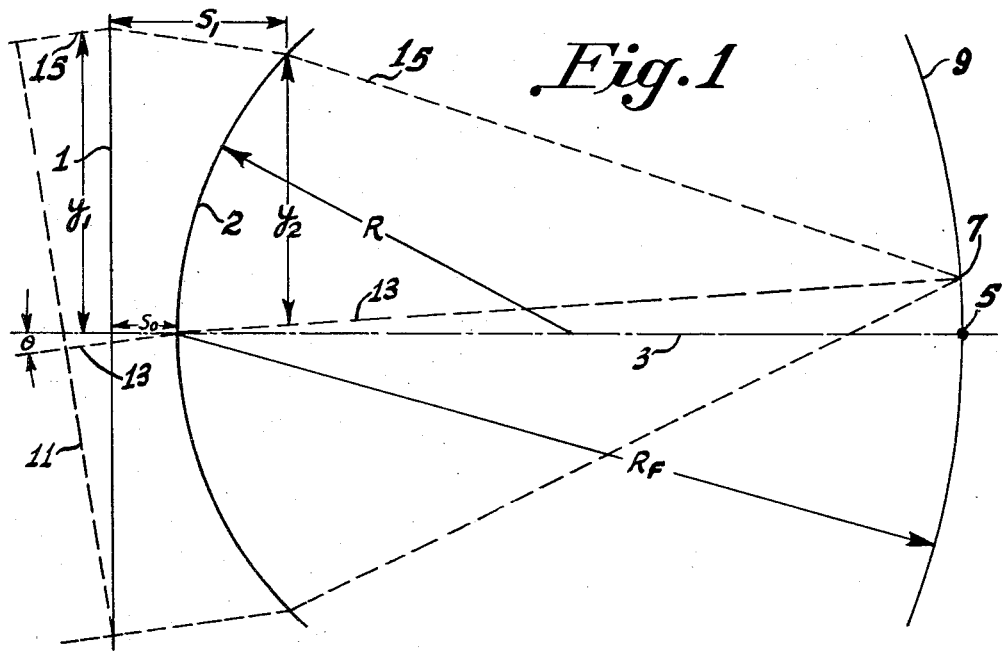
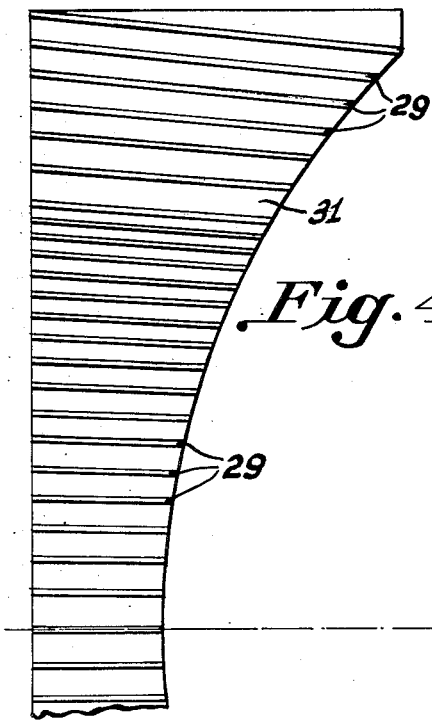
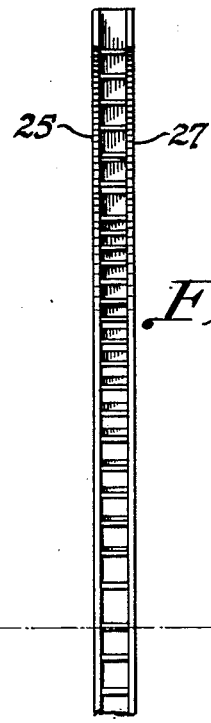
INVENTOR.
Henry B. DeVore
BY
ATTORNEY Nov. 7, 1950     H. B. DE VORE     2,528,582
LENS FOR FOCUSING RADIO WAVES
Filed Oct. 30, 1947     2 Sheets-Sheet 2

INVENTOR.
Henry B. DeVore
BY
ATTORNEY

Patented Nov. 7, 1950

2,528,582

UNITED STATES PATENT OFFICE 2,528,582

LENS FOR FOCUSING RADIO WAVES

Henry B. De Vore, Belle Mead, N. J., assignor to Radio Corporation of America, a corporation of Delaware Application October 30, 1947, Serial No. 783,126

4 Claims. (Cl. 250—33.63)

This invention relates to lens systems for focusing radio waves, and more particularly to improvements in lenses of the metal vane type.

Some types of radio and radar systems include scanning antennas, comprising a small radiator element and means for focusing radiation therefrom into a beam of parallel rays. The radiator can also act as a collector, with the focusing device functioning to concentrate upon it substantially all the energy incident upon the focusing device from a given direction. By moving the radiator or collector with respect to the principal axis of the focusing element, the direction of the beam may be varied to scan a region of space.

In order to minimize or prevent variation of the strength of the focused beam as the radiator moves for scanning, the radiator should move in a circular arc having its center at the center of the focusing element. If the radiator itself is directive, as is usual, its beam should be kept centered on the focusing device.

The locus of points of best focus of the focusing device should coincide with the path over which the radiator is moved, because otherwise the width of the focused beam will vary with its position. This calls for a focusing device having a curved field, whose center of curvature is at the center of the focusing device.

It is the principal object of the invention to provide wide-angle lenses which are particularly adapted for use in scanning antenna systems, in that they exhibit the required curvature of field with a minimum of loss and aberration.

Another object is to provide a lens of the described type for focusing radiation in the direction perpendicular to its electric vector.

A further object of the invention is to provide improved means for minimizing undesired reflections from metal vane lenses.

Figure 3:
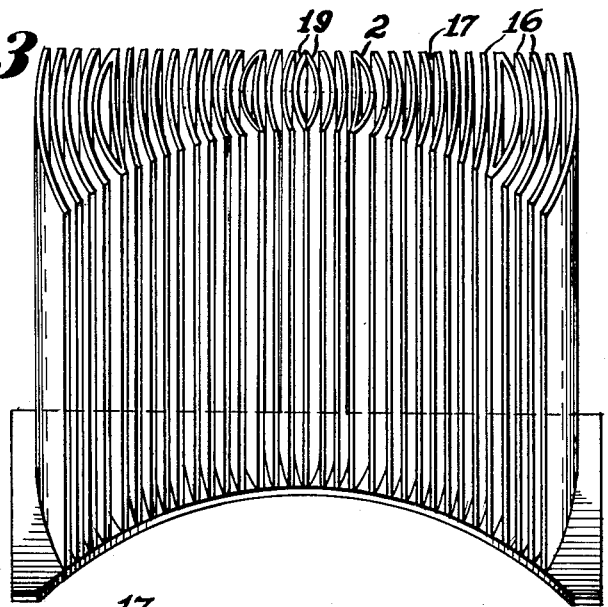
Figure 2:
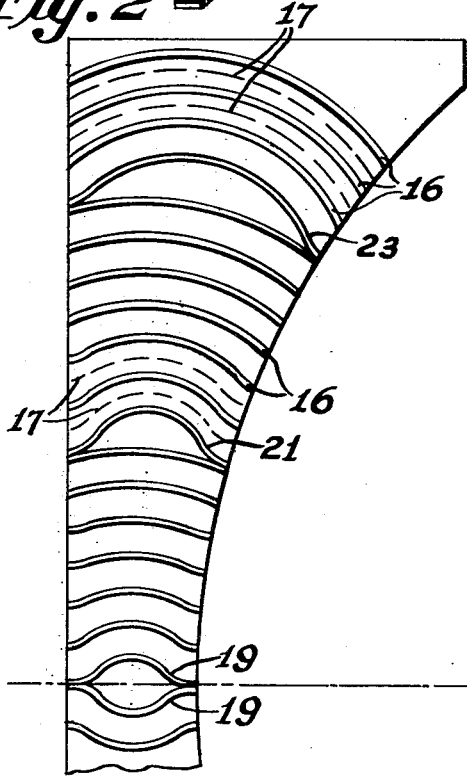
Figure 6:
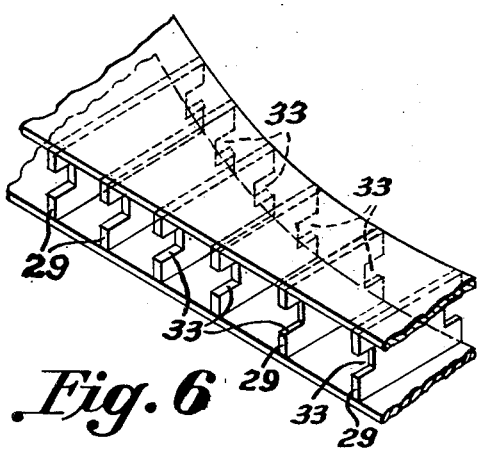

The invention will be described with reference to the accompanying drawings, wherein:

Figure 1 is a schematic drawing showing the principles of design of a lens in accordance with the present invention, Figure 2 is a sectional view of one form of lens which embodies the invention, Figure 3 is a perspective view of the structure of Fig. 2, Figure 4 is a sectional view of a second type of lens which also embodies the present invention, Figure 5 is an elevation of the structure of Fig. 4, and Figure 6 is a perspective view of a portion of a structure like that of Figs. 4 and 5, including anti-reflection means. Similar parts are designated similarly in the various drawings.

The lenses to be described are two-dimensional, i. e. they provide focusing in one coordinate only, like cylindrical lenses used in optics. The principles of the present invention are applicable also to three-dimensional lenses. Referring to Fig. 1, the boundary of a lens on the side where the radiation is in parallel rays is represented by the line 1. In the present example, this boundary is linear or flat.

The boundary on the side on which radiation is brought to a focal point is represented by the line 2. The principal axis of the lens is the line 3, and the point 5 represents the position of best focus on the line 3 for radiation parallel to the axis 3. The position of best focus for parallel radiation at some angle $\theta$ to the axis 3, is at the point 7. The locus of points of best focus for parallel rays is the curved line 9. Its radius is $R_f$ and its center is at the center of the curved lens boundary 2.

The phase length of the path from the lens boundary 1 to the boundary 2 along the axis 3 is designated $S_0$. The term "phase length" as used herein and in the appended claims is defined as the product of the free space wavelength of the energy by the time required for it to travel along the path between the boundary 1 and the boundary 2, this time being expressed as the number of periods of the radiation. Stated otherwise, $$S = \lambda t f$$

where S is the phase length, $\lambda$ is the free space wavelength, $t$ is the travel time in seconds, and $f$ is the frequency in cycles per second. It should be noted that if the phase length of any path through the lens is increased or decreased by an integral number of wavelengths the behavior of the lens will be unchanged, because the radiation emergent from this path will be unchanged in phase.

$S_1$ represents the phase length of another path through the lens, starting at a distance $Y_1$ from the axis 3 at the boundary 1 and terminating at a distance $Y_2$ from the axis 3 at the boundary 2.

The phase front of a wave travelling toward or away from the boundary 1 at an angle $\theta$ to the axis 3 is represented by the line 11, which lies at the angle $\theta$ with respect to the boundary 1. The central ray of the beam, i. e. that going through the center of the lens, is indicated by the line 13.

For aberration-free focusing, it is necessary that the total phase length of the path from any point on the line 11 to the focal point 7 be the same as that of the path from any other point on the line 11 to the point 7. One such path is shown by the dash line 15, which includes a portion between the line 11 and the boundary 1 parallel to the ray 13, a portion of phase length $S_1$ through the lens, and a converging portion between the boundary 2 and the point 7.

In prior art metal vane lenses, the distances $Y_1$ and $Y_2$ from the axis to the respective ends of any particular path through the lens have been equal. In other words, the planes of all of the vanes are ordinarily parallel to each other and to the principal axis of the lens. The present invention contemplates the reduction of aberration and provision of the desired curvature of field by taking advantage of the additional freedom in design afforded by allowing the distances $Y_1$ and $Y_2$ to differ.

I have determined that substantially optimum performance both as to accuracy of focus and curvature of field can be secured by making the lens to conform to the following specifications:

1. The boundary 1 should be straight or flat and the boundary 2 should be uniformly curved, with a radius R of one half the desired focal length $R_f$.

2. The paths through the lens should connect points on the boundaries 1 and 2 such that for each pair of points:

$$Y_2 = Y_1 \sqrt{1 - \left(\frac{Y_1}{2R}\right)^2}$$

3. The phase length $S_2$ of any path through the lens should be related to the phase length $S_0$ of the axial path as follows:

$$S_1 - S_0 = 2R\left(1 - \frac{Y_2}{Y_1}\right)$$

The lens shown in Figs. 2 and 3 is intended to operate with energy polarized such that its electric field vector is across the vanes, i. e. in the plane of the drawing in the view of Fig. 2. The metal vanes 16 are spaced from one another so that at no point is the spacing as much as one half of a wavelength in free space of the energy to be focused. The spaces between adjacent vanes define paths 17. In designing and constructing the lens of Fig. 2, some arbitrary thickness is selected for the center of the lens and the central vanes 19 are made slightly longer than this thickness. They are joined and bowed as shown to provide mechanical stiffness. Proceeding outward from the axis, other vanes are added with spacings less than one half wavelength and of increasing length as determined from their positions by the equations given above. No appreciable error is introduced by making the length of any vane equal to the path length appropriate to its two end points.

At some point it may be found that a vane should have a length less than the straight line path between the points occupied by its ends on the boundaries 1 and 2. In this case, the preceding vane has attached to it another vane one wavelength longer, as shown at 21 in Fig. 2. Beyond this point all vanes are made one wavelength longer than the computed value until the increasing distance between the boundaries 1 and 2 requires another discontinuous increase in vane length, as shown at 23 in Fig. 2. This process may be repeated as often as necessary. Fig. 3 shows the structure of Fig. 2 in perspective.

Figure 4 shows a modified lens structure for focusing energy which is polarized so as to have its electric vector perpendicular to the plane of the drawing, parallel to the vanes. This lens is particularly adapted for focusing radiation guided between parallel conducting sheets 25 and 27 (Fig. 5). The height of the lens, which is the distance between the sheets 25 and 27, is preferably less than one half wavelength. The metal vanes 29 in Fig. 4 are straight and flat and are spaced apart by distances greater than one half wavelength and less than one wavelength. The paths 17 through the lens may be considered as sections of hollow wave guide and the phase velocity therein is determined by the width, i. e. the spacing between vanes.

Although the guides are tapered from the boundary 1 to the boundary 2, the phase velocity is substantially the same as that through a guide of uniform width equal to that midway between the boundaries 1 and 2. Thus, for a guide having a length $l_1$ and a midwidth $d_1$, the phase length is:

$$S_1 = l_1 \sqrt{1 - \left(\frac{\lambda}{2d_1}\right)^2}$$

where $\lambda$ is the free space wavelength of the radiation. Since, for any path, the length $l_1$ between the points $Y_1$ and $Y_2$ on the boundaries can be found, the above relationship determines the appropriate vane spacing $d_1$.

In designing a lens of the type shown in Fig. 4, some spacing less than one wavelength and more than a half wavelength is chosen for the vanes 29 giving the path length $S_0$ at the axis. The next path length is computed, and, from the required increment in phase length, the width of the next guide is determined. This locates the second vane. The operation is carried out step by step for the width of the lens. As successive guides will become narrower, the variation of phase length with width becomes rapidly greater, and in order to make mechanical tolerances reasonable, it may be convenient to introduce one wavelength increments in the phase length at points at which the guide width approaches one half wavelength of the radiation. This is done by increasing the spacing between the vanes immediately following these points, as at 31 in Fig. 4.

Since the metal vanes 29 are parallel to the electric vector in the lens of Fig. 4, an appreciable portion of the radiation incident upon the lens may be reflected at the boundaries 1 and 2. This can be minimized by providing slots 33 substantially one quarter wavelength deep in the edges of the vanes 29, as shown in the perspective view of Fig. 6. The width of the slots 33 is substantially equal to the width of the rest of the vane 29. That is, the width of the slot is about half the distance between sheets 25 and 27.

What I claim is:

1. A lens for focusing radio waves for scanning antenna systems, including a plurality of wave conduits in side by side relationship, one end of each of said conduits being positioned with respect to the corresponding ends of the others of said conduits so as to define a flat surface, the other ends of said conduits being positioned with respect to each other so as to define a substantially uniformly curved surface of radius R, the distance $Y_1$ of each of said first mentioned ends from the principal axis of the lens being related to the distance $Y_2$ of the corresponding other end from said axis substantially as follows:

$$Y_2 = Y_1\sqrt{1 - \frac{Y_1}{2R}}$$

and the phase length $S_1$ of each of said conduits being related to the phase length $S_0$ of the axial conduit substantially as follows:

$$S_1 - S_0 = 2R\left(1 - \frac{Y_2}{Y_1}\right)$$

the phase length of a wave conduit being the product of free space wavelength, operating frequency, and wave transit time through the conduit whereby the locus of points of best focus for radiation incident upon said flat surface is a curve of radius 2R centered at the intersection of said axis with said curved surface.

2. The invention set forth in claim 1, wherein said wave conduits are constituted by spaced sheets of conductive material, said sheets extending across the electric vector of the radiation to be focused and curved so that the median line between any two sheets corresponds in length to the required phase length.

3. The invention as set forth in claim 1 wherein said wave conduits are constituted by spaced sheets of conductive material, said sheets being substantially parallel to the electric vector of the energy to be focussed, the mean spacing between any two sheets being related to the mean length of said two sheets so as to provide the required phase length, the phase length of a wave conduit being the product of free space wavelength, operating frequency, and wave transit time through the conduit.

4. The invention as set forth in claim 1 wherein said wave conduits are constituted by spaced sheets of conductive material, said sheets being substantially parallel to the electric vector of the energy to be focussed, the mean spacing between any two sheets being related to the mean length of said two sheets so as to provide the required phase length, the phase length of a wave conduit being the product of free space wavelength, operating frequency, and wave transit time through the conduit, and further including means for minimizing reflection from the surfaces defined by the ends of said wave guides, comprising slots substantially ¼ wavelength deep at the operating frequency in the edges of each of said sheets, said slots having a width approximately half that of said sheets.

HENRY B. DE VORE.

REFERENCES CITED

The following references are of record in the file of this patent:

UNITED STATES PATENTS

| Number | Name | Date |
|---|---|---|
| 2,078,302 | Wolff | Apr. 27, 1937 |
| 2,442,951 | Iams | June 8, 1948 |

OTHER REFERENCES

Proceedings I. R. E. 34, pp. 828–836, November 1946.